(12) United States Patent
Gerstenberger et al.

(10) Patent No.: US 8,738,983 B2
(45) Date of Patent: May 27, 2014

(54) METHODS AND ARRANGEMENTS IN A WIRELESS COMMUNICATIONS SYSTEM

(75) Inventors: Dirk Gerstenberger, Stockholm (SE); Johan Bergman, Stockholm (SE); Kai-Erik Sunell, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 458 days.

(21) Appl. No.: 12/865,064

(22) PCT Filed: Dec. 1, 2008

(86) PCT No.: PCT/SE2008/051378
§ 371 (c)(1),
(2), (4) Date: Jul. 28, 2010

(87) PCT Pub. No.: WO2009/096845
PCT Pub. Date: Aug. 6, 2009

(65) Prior Publication Data
US 2011/0004797 A1  Jan. 6, 2011

Related U.S. Application Data

(60) Provisional application No. 61/025,061, filed on Jan. 31, 2008.

(51) Int. Cl.
*H04L 1/18* (2006.01)
(52) U.S. Cl.
USPC .......................................... 714/749; 370/473
(58) Field of Classification Search
USPC .......................................... 714/749; 370/473
See application file for complete search history.

(56) References Cited

U.S. PATENT DOCUMENTS

| 2003/0202500 | A1 | 10/2003 | Ha et al. |
| 2007/0162646 | A1* | 7/2007 | Maitland et al. ................ 710/22 |
| 2007/0183451 | A1* | 8/2007 | Lohr et al. ..................... 370/473 |
| 2007/0230516 | A1* | 10/2007 | Torsner et al. ................ 370/538 |

FOREIGN PATENT DOCUMENTS

| CN | 1889412 | A | 1/2007 |
| RU | 2003137005 | A | 5/2005 |
| WO | 2005/109729 | A1 | 11/2005 |
| WO | 2005109729 | A1 | 11/2005 |
| WO | 2006085803 | A1 | 8/2006 |
| WO | 2006101347 | A1 | 9/2006 |
| WO | 2007129872 | A1 | 11/2007 |

OTHER PUBLICATIONS

CN Search Report issued Dec. 21, 2012 in re CN Application No. 200880126234.3 filed Dec. 1, 2008.
3rd Generation Partnership Project. "Feedback of Channel Quality." 3GPP TSG RAB WG2#57bis; R2-071391; St. Julian's, Malta; Mar. 26-30, 2007.

* cited by examiner

*Primary Examiner* — M. Mujtaba K Chaudry
(74) *Attorney, Agent, or Firm* — Coats & Bennett, P.L.L.C.

(57) ABSTRACT

The present invention relates to methods and arrangements that enable continuous adaptive control of the number of autonomous HARQ retransmissions. This is achieved by a solution, where the UE and the radio base station are using a number of autonomous HARQ retransmissions that can be adjusted based on observations in the UE and/or the radio base station. What is observed is the amount of HARQ retransmissions needed for the radio base station to correctly decode the latest received data packet(s).

27 Claims, 7 Drawing Sheets

METHODS AND ARRANGEMENTS IN A WIRELESS COMMUNICATIONS SYSTEM

TECHNICAL FIELD

The present invention relates to the area of wireless communications, and especially to autonomous HARQ retransmissions of a wireless communication network.

BACKGROUND

The Universal Mobile Telecommunication System (UMTS), also referred to as the third generation (3G) system or the wideband code division multiplexing access (WCDMA) system, is designed to succeed GSM. UMTS Terrestrial Radio Access Network (UTRAN) is the radio access network of a UMTS system. In the UTRAN architecture, the user equipments (UE) 150 of a specific cell 110, are wirelessly connected to a NodeB (NB) 130, which in turn is connected to a Radio Network Controller (RNC) 100, as illustrated in FIG. 1.

The evolution of UTRAN and other radio interface standards is strongly focused on packet access technologies, to support packet data services such as VoIP, where the main principle is that small data units or packets carry the data over the communication medium and each packet comprises a header describing the data. To support the use of delay sensitive packet-data services, increased data rates and reduced Round Trip Times (RTT) is a requirement. RTT is defined as the time it takes for a packet to get from a first machine to a second machine and back again. In order to allow for reduced RTT and increased data rates in a UTRAN, the Transmission Time Interval (TTI) is reduced from 10, 20, 40 or 80 ms down to 2 ms. The TTI is defined as the duration of data transmission where coding and interleaving is performed.

Although a short TTI is generally beneficial for upper layer protocols and applications, there is a downside as well: The reliability of the transmitted data (and thus the coverage) decreases with a shortened TTI, as a shortened TTI means reduced energy per information bit. One solution to this problem is to increase the transmission power and thus increase the energy per information bit. The transmission of data using 2 ms TTI thus requires relatively higher transmission power, but in a transmission power limited situation the transmission will be more vulnerable to errors than the transmission of data by using 10, 20, 40 or 80 ms TTI. With 2 ms TTI it is thus difficult to ensure similar coverage as with a longer TTI. The coverage is especially limited in uplink (mobile-to-fixed direction), since a handheld UE cannot have as high transmitter power as the network side.

A widely-known solution to this coverage problem is to employ retransmission protocols, which means that receiving side requests for retransmissions from the transmitting side until the packet is successfully received (or the maximum number of retransmission is reached). A further improvement is to combine the retransmission protocol with soft-combining functionality where the receiver do not discard erroneously received packets but buffers their soft-bit values and combines these values with the soft-bits values of the retransmitted packets. This if often referred to as Hybrid Automatic Repeat Request (HARQ) with soft combining.

HARQ is a combination of forward error-correcting (FEC) coding and Automatic Repeat Request (ARQ). In FEC coding, redundancy is introduced in the transmitted signal. Parity bits are added to the information bits prior to the transmission, and the parity bits are computed from the information bits using a method given by the coding structure used. In an ARQ scheme, the receiver uses an error-detecting code to detect if the received packet is in error or not. If no error is detected, a positive acknowledgement (ACK) is sent to the transmitter, and if an error is detected, a negative acknowledgement (NAK) is sent. After a NAK, the transmitter will retransmit the same information again. HARQ thus uses FEC codes to correct a subset of all errors and relies on error detection with retransmission for handling the rest of the errors.

To reduce the delay introduced by the HARQ retransmissions, one solution is to allow a pre-defined number of retransmissions that are transmitted without awaiting the ACK or NAK between them. These so called autonomous retransmissions can be transmitted in consecutive TTIs, or in certain pre-configured TTIs that are not consecutively transmitted. If it turns out that the pre-defined number of autonomous retransmissions was not enough to get the data packet through, the UE will receive a NAK, and will then have to continue retransmitting (e.g. either ordinary HARQ retransmissions or another set of autonomous retransmissions) until it receives an ACK from the NodeB in response to a successful reception of the data packet (or until the maximum number of retransmissions is reached).

Although autonomous HARQ retransmissions can somewhat alleviate the above-described coverage problems, a fixed number of autonomous retransmissions will in some cases result in an excessive number of retransmissions when the UE is in a favorable situation in the cell. In general, an excessive number of HARQ retransmissions is a disadvantage, as the requirements on the receiver resources become strong at the network side, which translates into a high cost. If an amount of UEs are always performing a large number of HARQ retransmissions, the cost for the provided service becomes high. A large number of HARQ retransmissions also increase the delay, which is undesirable for real-time services such as voice e.g. On the other hand, the fixed number of autonomous retransmissions will sometimes not be enough to get a correctly received data packet, and some extra transmissions will therefore be needed. This increases the delay as well.

SUMMARY

The object of the present invention is to provide methods and arrangements that obviate some of the above disadvantages, and improve the uplink coverage with HARQ retransmissions in a wireless communications system while reducing cost and delay.

This is achieved by a solution based on continuous adaptive control of the number of autonomous HARQ retransmissions. The UE and the radio base station are using a number of autonomous HARQ retransmissions that can be adjusted based on observations in the UE and/or the radio base station. What is observed is the amount of HARQ retransmissions needed for the radio base station to correctly decode the latest received data packet(s).

Thus in accordance with a first aspect of the present invention, a method of uplink HARQ retransmissions in a radio base station of a wireless communications system is provided. The radio base station receives data packets from at least one user equipment adapted to use autonomous HARQ retransmissions for transmitting the data packets received at the radio base station. The method comprises, for each reception of a new data packet from the at least one user equipment, the steps of observing the amount of HARQ retransmission needed to correctly decode the latest at least one received data packet, and adjusting the number of autonomous HARQ retransmissions, based on the observed amount of HARQ retransmissions.

In accordance with a second aspect of the present invention, a method of uplink HARQ retransmissions in a user equipment of a wireless communications system is provided. The user equipment transmits data packets to at least one radio base station, and is adapted to use autonomous HARQ retransmissions for the data packet transmission. The method comprises, for each transmission of a new data packet to the at least one radio base station, the step of adjusting the number of autonomous HARQ retransmissions, based on an observed amount of HARQ retransmissions.

In accordance with a third aspect of the present invention, a radio base station of a wireless communications system is provided. The radio base station is adapted to receive data packets from at least one user equipment, adapted to use autonomous HARQ retransmissions for transmitting the data packets received at the radio base station. The radio base station comprises means for observing the amount of HARQ retransmissions needed to correctly decode the latest at least one received data packet. It also comprises means for adjusting the number of autonomous HARQ retransmissions, based on the observed amount of HARQ retransmissions.

In accordance with a fourth aspect of the present invention, a UE of a wireless communications system is provided. The UE is adapted to transmit data packets to at least one radio base station, and to use autonomous HARQ retransmissions for the data packet transmission. The UE comprises means for adjusting the number of autonomous HARQ retransmissions, based on an observed amount of HARQ retransmissions.

An advantage of embodiments of the present invention is that instead of configuring a fixed number of autonomous HARQ retransmissions for all UEs and for all cells, the number of autonomous HARQ retransmissions can be adjusted to what is required in the specific coverage situation of the UE. Thus, an adjusted optimized number of autonomous HARQ retransmissions is used for each UE and for each retransmission.

Another advantage with embodiments of the present invention is that the adjusted number of autonomous HARQ retransmissions results in reduced cost, delay and overhead, as the number of retransmissions is never excessively high. It also results in better coverage, by avoiding too few autonomous HARQ retransmissions. A case where this is especially important, is when the UE uses a delay sensitive service such as VoIP that has a short TTI.

Yet another advantage with embodiments of the present invention is that the number of higher layer Radio Link Control (RLC) retransmissions (used when the HARQ retransmissions have failed to result in a correctly received data packet) is reduced by avoiding too few lower layer HARQ retransmissions. Also this has an effect on the total delay.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a UTRAN with autonomous HARQ retransmissions. It should though be noted that the invention and its exemplary embodiments may also be applied to other types of radio access technologies with similar characteristics to UTRAN in terms of retransmissions.

Figure 1:
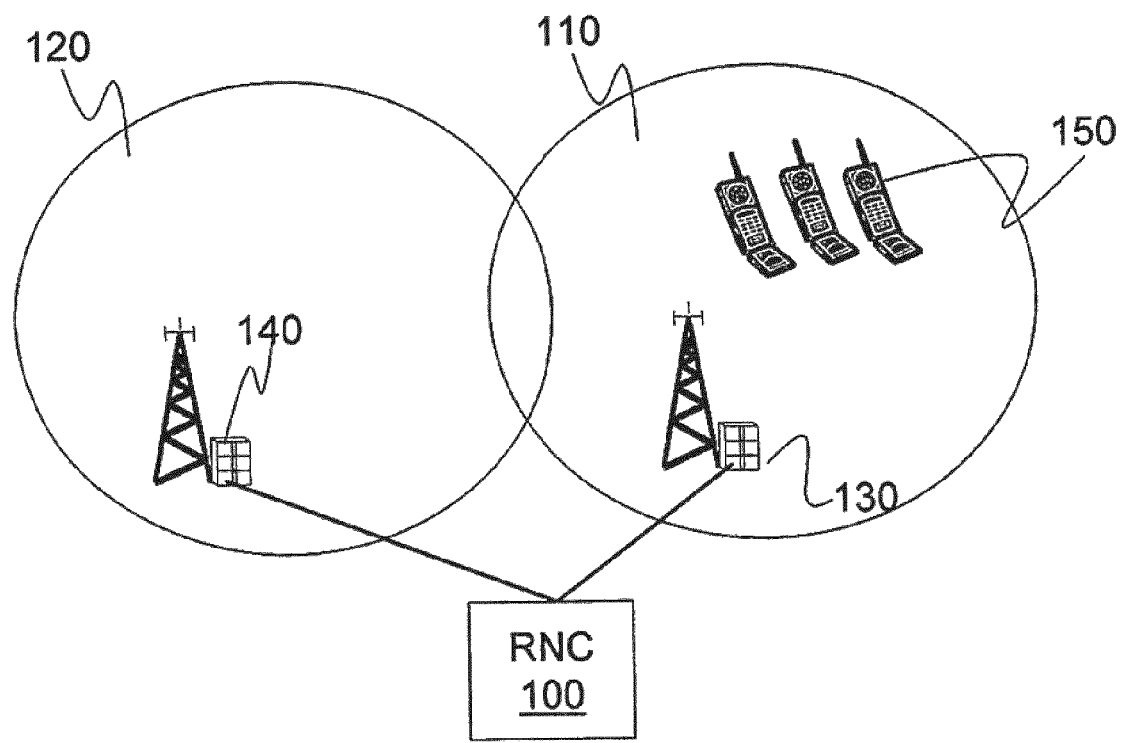
FIG. 1 illustrates schematically a part of a UTRAN wherein the present invention may be implemented.

In the present invention with reference to FIG. 1, the UEs 150 and the NodeBs 130, 140 are using an adjustable number of autonomous HARQ retransmissions for the uplink transmission. Both the UE 150 and the serving NodeB 130 need to have the knowledge of the actual number of autonomous HARQ retransmissions to use. During a soft handover from one cell 110 to another cell 120, there is also a need for a non serving NodeB 140 to know about the actual number of autonomous HARQ retransmissions, as they are receiving the data packets as well. For every initial uplink transmission of a data packet, the number of autonomous HARQ retransmissions may be adjusted based on observations in the UE 150 and/or the NodeB 130. What is observed is the amount of HARQ retransmissions needed for the NodeB 130 to correctly decode the previously received data packet(s). If a previous data packet would have needed more HARQ retransmissions than the actual number of autonomous HARQ retransmissions indicated, it is fair to believe that the UE's 150 coverage situation is such that a higher amount of autonomous HARQ retransmissions is needed. The number of autonomous HARQ retransmissions can thus be adjusted accordingly.

There are several alternatives on how the UE can be informed about the adjusted number of autonomous HARQ retransmissions. Either the NodeB informs the UE directly over the air interface, or indirectly via the RNC, i.e. the RNC informs the UE of the adjusted number in a message transparently sent via the NodeB. Another alternative is that the UE uses pre-determined or standardised rules, using its own observations as input to derive how to adjust the number of retransmissions. The same pre-determined or standardized rule is then used by the NodeB, so that the UE and the NodeB comes to the same adjusted number of retransmissions without any signalling.

Thus, according to a first embodiment of the present invention, the NodeB observes the amount of HARQ retransmissions needed to correctly decode the latest received data packet or packets, and initiates an adjustment of the number of autonomous HARQ retransmissions based on its observations.

According to a second embodiment of the present invention, the adjustment is done by first adjusting the number of autonomous HARQ retransmissions in the NodeB and secondly transmitting a request for an adjustment to the UE. The UE will then adjust the number of autonomous HARQ retransmissions accordingly. The benefit of this embodiment is that the adjustment is signaled over the air interface in a time efficient way. In one alternative embodiment, the request is transmitted via a High Speed Shared Control Channel (HS-SCCH) order. In another alternative embodiment the request is transmitted via Enhanced Dedicated Channel (E-DCH) Absolute Grant Channel (E-AGCH).

In a third embodiment, this second embodiment is complemented by transmitting information about the adjusted number of autonomous HARQ retransmissions to the RNC, in order for the RNC to be able to inform all soft handover NodeBs about the adjustment. The benefit of this is that it supports the case of a UE in soft handover.

According to a fourth embodiment, which is an alternative to the second and third embodiment, the adjustment is done by first adjusting the number of autonomous HARQ retransmissions in the NodeB and secondly transmitting a request for an adjustment to the RNC. This makes it possible for the RNC to transmit a request for an adjustment, transparently via the NodeB to the UE, and to inform all soft handover NodeBs about the adjustment. Thus, also this embodiment supports the case of a UE in soft handover. The RNC request for an adjustment to the UE, may be transmitted by means of Radio Resource Control (RRC) signalling. The RNC can use signalling over the Iub interface to inform the connected NodeB(s) or over the Iur interface to inform the NodeB(s) connected through another RNC.

In either of the second, third and fourth embodiment, the NodeB may signal an increase or decrease in terms of the number of autonomous HARQ retransmissions. The signalled increase or decrease value may for example be one single retransmission, but other values are also possible. An alternative embodiment is that the NodeB directly indicates an absolute value to adjust the number of autonomous HARQ retransmissions to.

In a fifth embodiment, both the UE and the NodeB uses a pre-determined rule to derive the number of autonomous HARQ retransmissions to adjust to. The observation of the number of HARQ retransmissions used to correctly decode the latest packet or packets, made both in the UE and in the NodeB, are used as input to this pre-determined rule. In this fifth embodiment, there is no need for signalling between the UE and the NodeB in order to derive an adjusted number of HARQ retransmissions to use. Also this fifth embodiment can be complemented by transmitting information about the adjusted number of autonomous HARQ retransmissions to the RNC, in order for the RNC to be able to inform all soft handover NodeBs about the adjustment.

The pre-determined rule used by the UE and the NodeB, can for instance state that the adjusted number of autonomous HARQ retransmissions equals the observed number of HARQ retransmissions needed to correctly decode the latest packet adjusted with a number of N retransmissions (N may e.g. take values 0, +/−1, +/−2 etc.).

The rules can be described as a function $f(\cdot)$ over the number of HARQ retransmissions needed for the last M packets. For instance, the function $f(\cdot)$ can be defined as the average number of retransmissions needed over the latest M packets. When S corresponds to the sum of the number of HARQ retransmissions needed for the latest M packets, this function is described as $f(\cdot)=(1/M)\cdot S$.

In another example, said function $f(\ )$ is defined, as an average function (or any other suitable statistical function) with parameters $a_i \cdot R_i$ where, for a previous packet i, the parameter $a_i$ denotes a real-valued weight factor valid for said packet i, and the parameter $R_i$ denotes the number of HARQ retransmissions needed to correctly decode said packet i. The weight factors are known in both the UE and NodeB, and can be informed to the UE, e.g., through HS-SCCH orders or can be configured by the RNC. Thus $f(\cdot)=f(a_1 \cdot R_1, a_2 \cdot R_2, \ldots, a_M \cdot R_M)$.

Figure 2A:
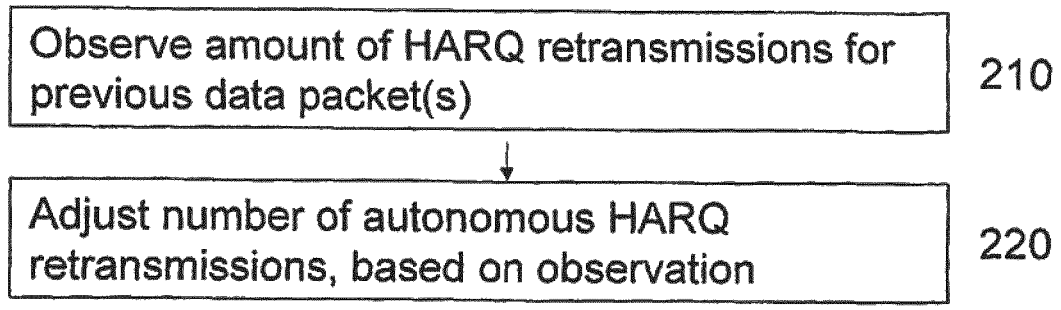
FIGS. 2a and 2b are flowcharts of the methods of the NodeB and UE respectively according to embodiments of the present invention.

FIG. 2a is a flowchart of the method for the radio base station, according to the first embodiment of the present invention described above. In step 210, the radio base station observes how many retransmissions that are needed to correctly decode one or more previously received data packet(s). Based on this observation, the radio base station can adjust the number of autonomous HARQ retransmissions in step 220. The number of retransmissions is thus adjusted to the UEs coverage situation at that point in time.

Figure 2B:
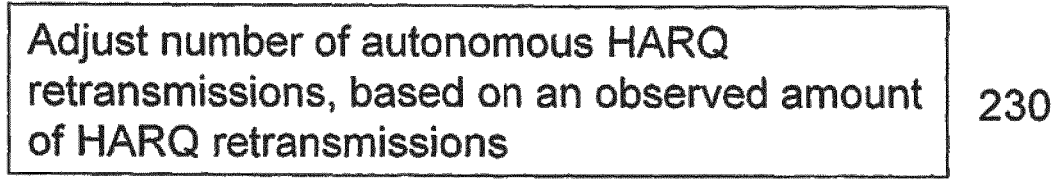

Furthermore, FIG. 2b is a flowchart of the method for the user equipment, according to the first embodiment of the present invention described above. In step 230, the UE adjusts the number of autonomous HARQ retransmissions, based on observations either in the radio base station or in the UE.

Figure 3A:
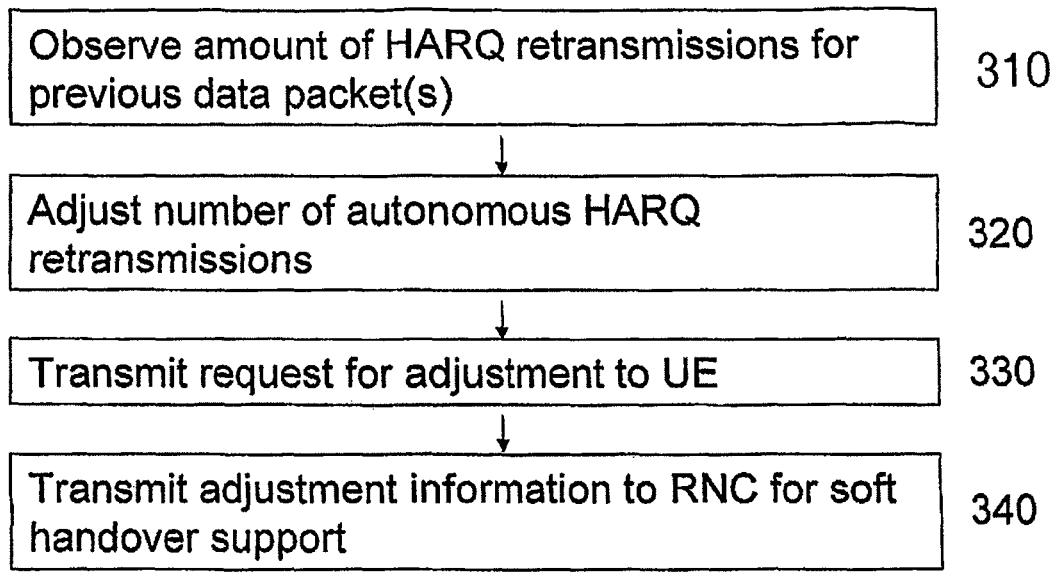
FIGS. 3a and 3c are flowcharts of the methods of the NodeB and UE respectively according to embodiments of the present invention.

Moreover, FIG. 3a is a flowchart of the method for the radio base station, according to the second and third embodiment described above. In step 310, the radio base station observes how many retransmissions that are needed to correctly decode one or more previously received data packet(s). Based on this observation, the radio base station can adjust its own number of autonomous HARQ retransmissions in step 320, and then transmit a request for an adjustment to the UE in step 330. In step 340, the information about the adjustment is also transmitted to the RNC, in order for the RNC to inform soft handover NodeBs about the adjustment. Soft handover NodeBs are also receiving retransmissions from the UE and need to know if the number of autonomous HARQ retransmissions has been adjusted.

Figure 3B:
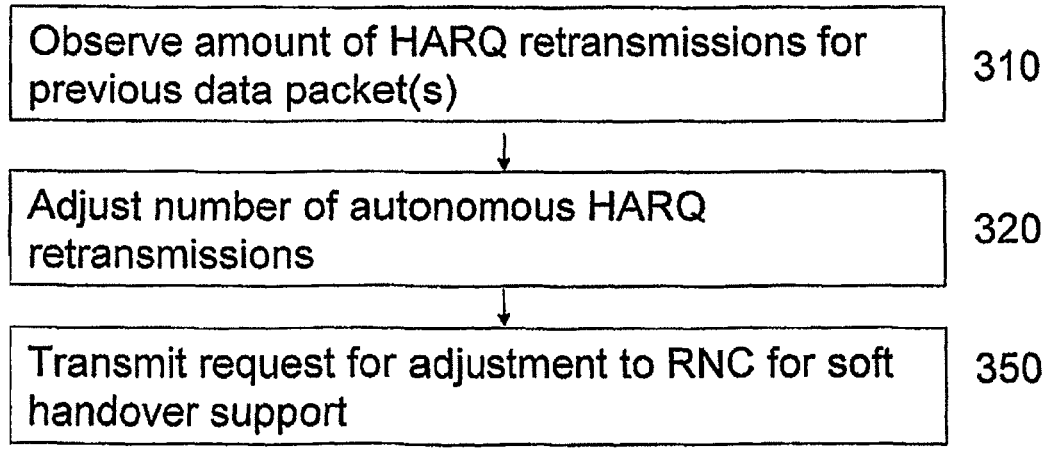

FIG. 3b is a flowchart of the method for the radio base station, according to the fourth embodiment described above. The first two steps 310 and 320, are the same as for the embodiments illustrated in FIG. 3a, but the request for an adjustment is in step 350 transmitted indirectly to the UE via the RNC in this embodiment, instead of transmitting it directly to the UE as in step 330 of FIG. 3a.

Figure 3C:
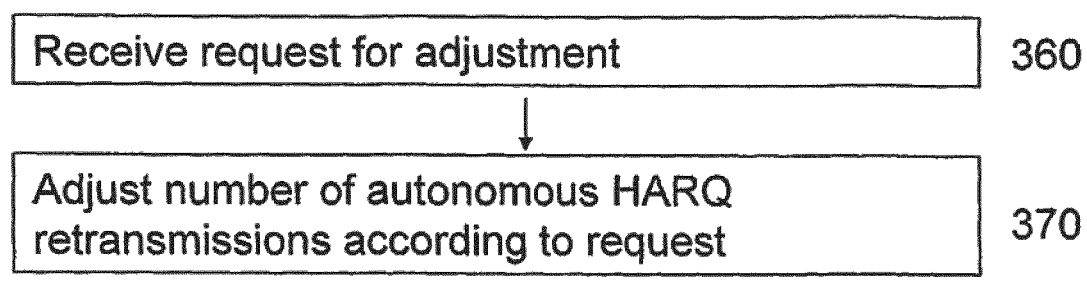

Furthermore, FIG. 3c is a flowchart of the method for the user equipment, according to the second or fourth embodiment. In step 360, the UE receives the request for adjustment, either directly from the NodeB (second embodiment) or indirectly via the RNC (fourth embodiment), and in step 370 the UE adjusts the number of autonomous HARQ retransmissions accordingly.

Figure 4A:
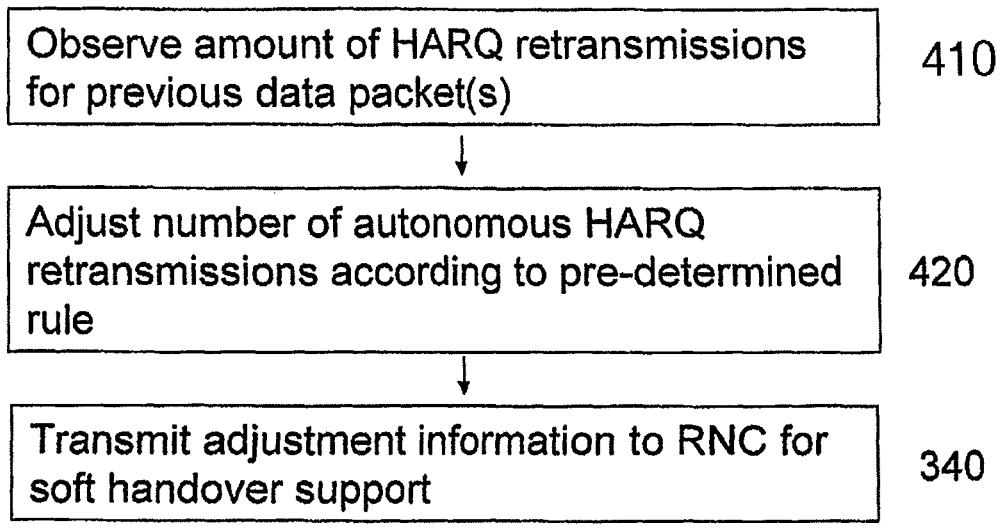
FIGS. 4a and 4b are flowcharts of the methods of the NodeB and UE respectively according to embodiments of the present invention.
Figure 4B:
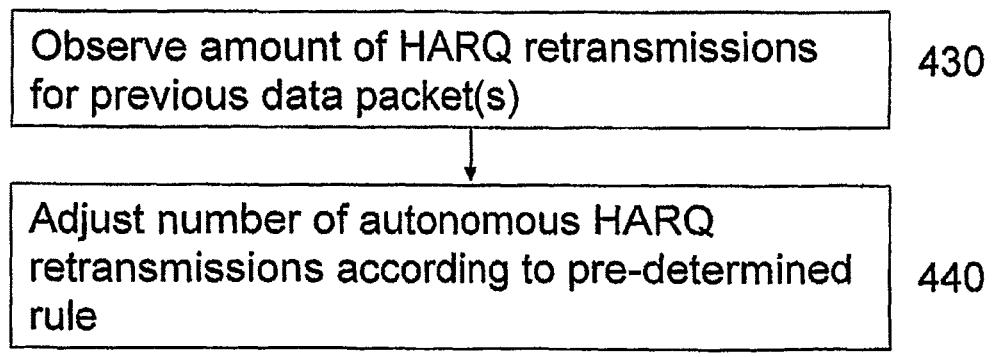

Finally, FIG. 4a and FIG. 4b is a flowchart of the method for the radio base station and the UE respectively, according to the fifth embodiment described above. In this embodiment both the radio base station and the UE observe how many retransmissions that are needed to correctly decode one or more previously received/transmitted data packet(s) (step 410 for the radio base station and step 430 for the UE), and adjust the number of autonomous HARQ retransmission according to a pre-determined rule (step 420 and 440). As the observation and pre-determined rule is the same in both the radio base station and the UE, they will both derive the same adjusted number of retransmissions without any signaling between them. Also this embodiment comprises step 340, the same step as in FIG. 3a illustrating the third embodiment, for informing the RNC about the adjustment. This makes it possible for the RNC to inform soft handover NodeBs about the adjustment.

Figure 5A:
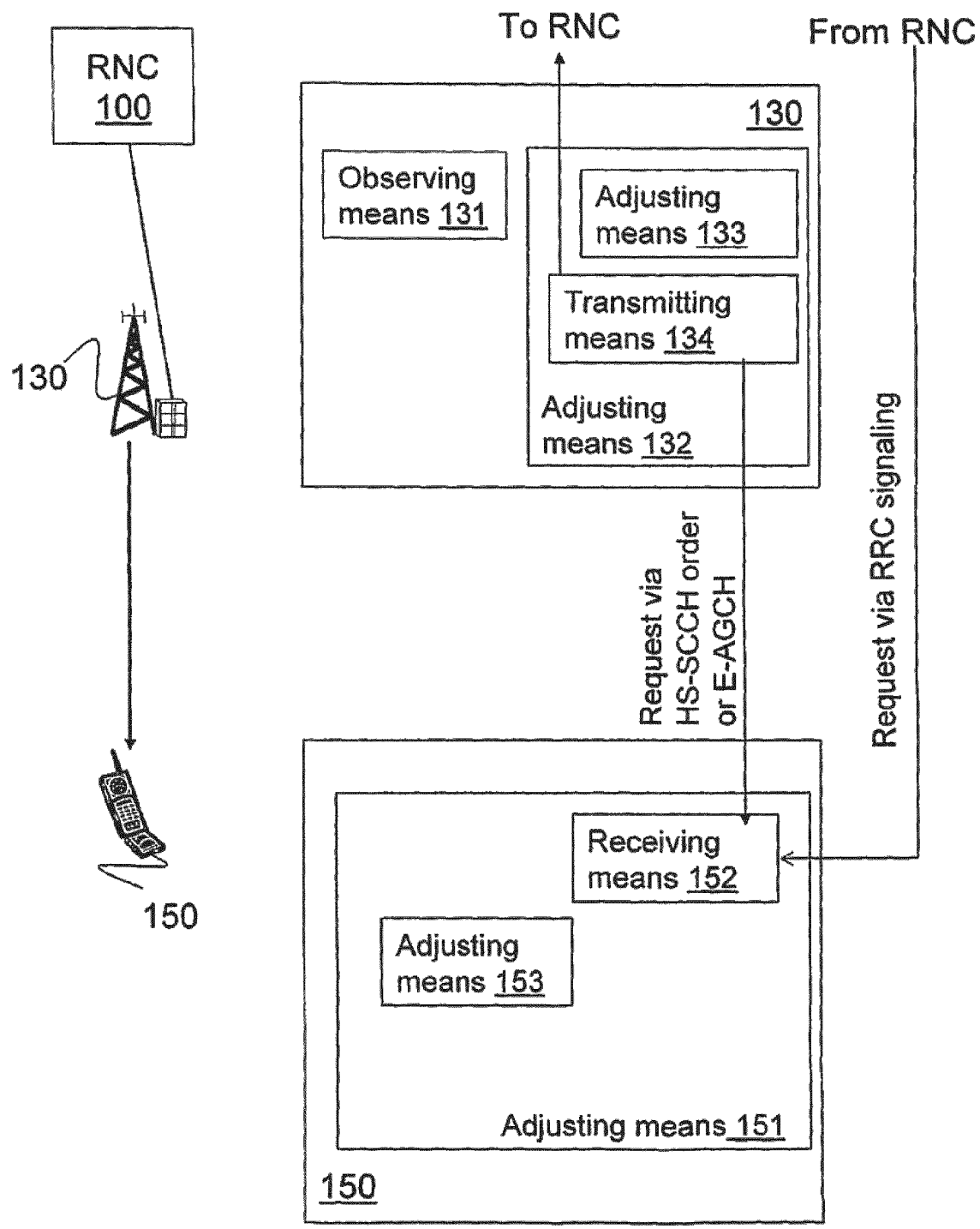
FIGS. 5a and 5b illustrate schematically the NodeB and UE according to embodiments of the present invention.

Schematically illustrated in FIG. 5a and according to the first, second, third and fourth embodiment described above, the radio base station 130 comprises means for observing 131 the amount of HARQ retransmission needed to correctly decode the latest at least one received data packet, and means for adjusting 132 said number of autonomous HARQ retransmissions, based on the observed amount of HARQ retransmissions (first embodiment). The means for adjusting 132 further comprises means for adjusting 133 said number of autonomous HARQ retransmissions, and means for transmitting 134 a request for an adjustment of said number of autonomous HARQ retransmissions to said user equipment and means for transmitting 134 information about the adjustment of said number of autonomous HARQ retransmissions to the RNC (third embodiment).

Also illustrated in FIG. 5a is the UE 150. It comprises means for adjusting 151 said number of autonomous HARQ retransmissions, based on an observed amount of HARQ retransmissions (first embodiment). The means for adjusting 151 further comprises means for receiving 152 a request for an adjustment of said number of autonomous HARQ retransmissions, and means for adjusting 153 said number of autonomous HARQ retransmissions according to the received request (third embodiment).

Figure 5B:
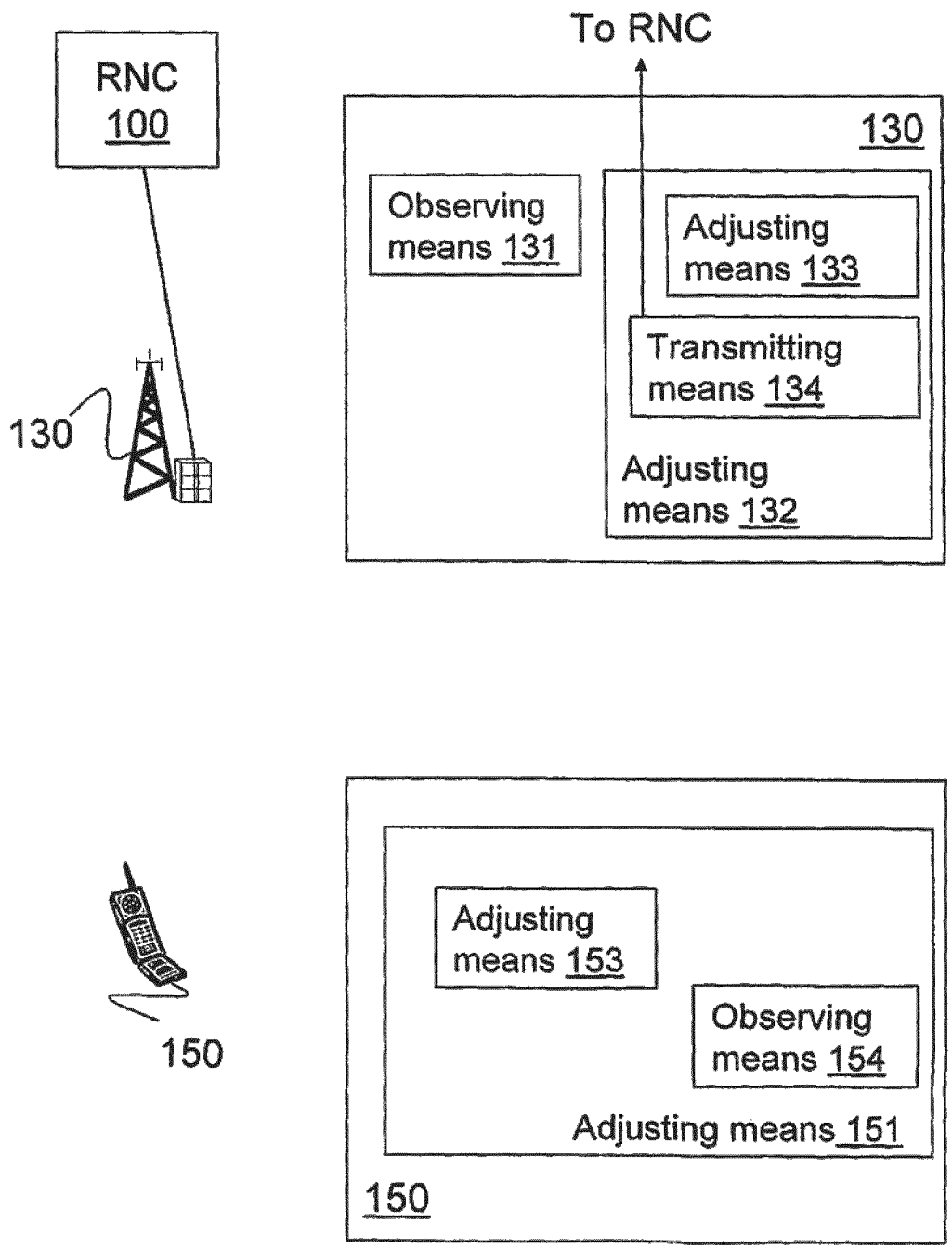

Schematically illustrated in FIG. 5b and according to the fifth embodiment described above, the radio base station 130 comprises means for observing 131 the amount of HARQ retransmission needed to correctly decode the latest at least one received data packet, and means for adjusting 132 said number of autonomous HARQ retransmissions, based on the observed amount of HARQ retransmissions. The means for adjusting 132 further comprises means for adjusting 133 said number of autonomous HARQ retransmissions, and means for transmitting 134 information about the adjustment of said number of autonomous HARQ retransmissions to the RNC.

Also illustrated in FIG. 5b is the UE 150. It comprises means for adjusting 151 said number of autonomous HARQ retransmissions, based on an observed amount of HARQ retransmissions. In this fifth embodiment, the observation of the amount of HARQ retransmissions which is used as a basis for the adjustment in the UE, is also done in the UE. Thus, the means for adjusting 151 further comprises means for observing 154 the amount of HARQ retransmissions needed to correctly decode one or more previous packets, and means for adjusting 153 said number of autonomous HARQ retransmissions according to a pre-determined rule.

It should be noted that the means illustrated in FIGS. 5a and 5b may be implemented by physical or logical entities using software functioning in conjunction with a programmed microprocessor or general purpose computer, and/or using an application specific integrated circuit (ASIC).

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method of uplink hybrid automatic repeat request (HARQ) retransmissions in a radio base station of a wireless communications system, said radio base station controlled by a radio network controller (RNC) and receiving data packets from at least one user equipment adapted use autonomous HARQ retransmissions for transmitting the data packets received at the radio base station, said method comprising, for each reception of a new data packet from the at least one user equipment:

observing the amount of HARQ retransmissions needed to correctly decode the latest at least one received data packet;

adjusting said number of autonomous HARQ retransmissions, based on the observed amount of HARQ retransmissions; and transmitting a request for an adjustment of said number of autonomous HARQ retransmissions to the RNC, in order for the RNC to transmit a request for an adjustment to the user equipment and inform at least one soft handover radio base station, also receiving data packets from the at least one user equipment, about the adjustment.

2. The method of claim 1 wherein the adjustment comprises an increase or decrease by at least one of said number of autonomous HARQ retransmissions.

3. The method of claim 1 wherein the adjustment comprises setting said number of autonomous HARQ retransmissions to an absolute value.

4. The method of claim 1 wherein adjusting said number of autonomous HARQ retransmissions comprises adjusting said number of autonomous HARQ retransmissions according to a pre-determined rule that uses the observed amount of HARQ retransmissions as input.

5. The method of claim 4 wherein the pre-determined rule states that the adjusted number of autonomous HARQ retransmissions is equal to the observed amount of HARQ retransmission needed to correctly decode the latest received data packet, increased or decreased by at least one.

6. The method of claim 4 wherein the pre-determined rule states that the adjusted number of autonomous HARQ retransmissions is a statistical function of the observed amount of HARQ retransmission needed to correctly decode the latest at least two received data packets.

7. A method of uplink hybrid automatic repeat request (HARQ) retransmissions in a user equipment of a wireless communications system, wherein the user equipment transmits data packets to at least one radio base station, and is adapted to use autonomous HARQ retransmissions for said data packet transmission, said method comprising, for at least one transmission of a new data packet to the at least one radio base station:

receiving a request for an adjustment of said number of autonomous HARQ retransmissions; and adjusting said number of autonomous HARQ retransmissions, based on an observed amount of HARQ retransmissions, according to the received request.

8. The method of claim 7, wherein the request for an adjustment is received via an order on a High Speed Shared Control Channel (HS-SCCH).

9. The method of claim 7, wherein the request for an adjustment is received via an Enhanced Dedicated Channel Absolute Grant Channel (E-AGCH).

10. The method of claim 7 wherein the adjustment comprises an increase or decrease by at least one of said number of autonomous HARQ retransmissions.

11. The method of claim 7 wherein the adjustment comprises setting said number of autonomous HARQ retransmissions to an absolute value.

12. The method of claim 7 wherein adjusting said number of autonomous HARQ retransmissions comprises:
observing the amount of HARQ retransmission needed to correctly transmit the latest at least one transmitted data packet; and
adjusting said number of autonomous HARQ retransmissions according to a pre-determined rule that uses said observed amount of HARQ retransmissions as input.

13. The method of claim 12, wherein the pre-determined rule states that the adjusted number of autonomous HARQ retransmissions is equal to the observed amount of HARQ retransmission needed to correctly transmit the latest transmitted data packet, increased or decreased by a at least one.

14. The method of claim 12, wherein the pre-determined rule states that the adjusted number of autonomous HARQ retransmissions is a statistical function of the observed amount of HARQ retransmission needed to correctly transmit the latest at least two transmitted data packets.

15. A radio base station of a wireless communications system, adapted to receive data packets from at least one user equipment adapted to use autonomous hybrid automatic repeat request (HARQ) retransmissions for transmitting the data packets received at the radio base station, said radio base station comprising:
an observing function operative to observe the amount of HARQ retransmissions needed to correctly decode the latest at least one received data packet;
an adjusting function operative to adjust said number of autonomous HARQ retransmissions based on the observed amount of HARQ retransmissions; and
a transmitter operative to transmit a request for an adjustment of said number of autonomous HARC retransmissions to a radio network controller (RNC).

16. The radio base station of claim 15, wherein the adjustment comprises an increase or decrease by at least one of said number of autonomous HARQ retransmissions.

17. The radio base station of claim 15, wherein the adjustment comprises setting said number of autonomous HARQ retransmissions to an absolute value.

18. The radio base station of claim 15 wherein the transmitter is operative to transmit the request for an adjustment of said number of autonomous HARC retransmissions to the RNC in order for the RNC to inform at least one soft handover radio base station, also receiving data packets from the at least one user equipment, about the adjustment.

19. The radio base station of claim 15 wherein the adjusting function is further operative to adjust said number of autonomous HARQ retransmissions according to a pre-determined rule that uses the observed amount of HARQ retransmissions as input.

20. The radio base station of claim 19 wherein the pre-determined rule slates that the adjusted number of autonomous HARQ retransmissions is equal to the observed amount of HARQ retransmission needed to correctly decode the latest received data packet, increased or decreased by at least one.

21. The radio base station of claim 19 wherein the pre-determined rule states that the adjusted number of autonomous HARQ retransmissions is a statistical function of the observed amount of HARQ retransmission needed to correctly decode the latest at least two received data packets.

22. A user equipment of a wireless communications system, adapted to transmit data packets to at least one radio base station, and adapted to use autonomous hybrid automatic repeat request (HARQ) retransmissions for said data packet transmission, said user equipment comprising:
a receiver operative to receive a request for an adjustment of said number of autonomous HARQ retransmissions; and
an adjusting function operative to adjust said number of autonomous HARQ retransmissions, based on an observed amount of HARQ retransmissions, according to the received request.

23. The user equipment of claim 22 wherein the adjustment comprises an increase or decrease by at least one of said number of autonomous HARQ retransmissions.

24. The user equipment of claim 22 wherein the adjustment comprises setting said number of autonomous HARO retransmissions to an absolute value.

25. The user equipment of claim 22 wherein the adjusting function comprises:
an observing function operative to observe the amount of HARQ retransmission needed to correctly transmit the latest at least one transmitted data packet; and
an adjusting function operative to adjust said number of autonomous HARQ retransmissions according to a pre-determined rule that uses said observed amount of HARQ retransmissions as input.

26. The user equipment of claim 25 wherein the pre-determined rule states that the adjusted number of autonomous HARQ retransmissions is equal to the observed amount of HARO retransmission needed to correctly transmit the latest transmitted data packet, increased or decreased by a at least one.

27. The user equipment of claim 25 wherein the pre-determined rule states that the adjusted number of autonomous HARQ retransmissions is a statistical function of the observed amount of HARQ retransmission needed to correctly transmit the latest at least two transmitted data packets.

* * * * *